United States Patent [19]

Montgomery

[11] 4,032,166
[45] June 28, 1977

[54] BICYCLE PACKAGE TRANSPORT DEVICE

[76] Inventor: W. Leon Montgomery, 6632 Kingsbury Drive, Dallas, Tex. 75231

[22] Filed: Feb. 26, 1976

[21] Appl. No.: 661,713

[52] U.S. Cl. .............................. 280/204; 180/21; 280/112 A; 280/772

[51] Int. Cl.² .......................................... B62K 27/06

[58] Field of Search ............ 280/204, 203, 112 A, 280/112 R, 111, 87 B, 292; 180/21, 26, 25 R

[56] References Cited

UNITED STATES PATENTS

| 1,146,296 | 7/1915 | Worksman | 280/204 |
| 1,311,816 | 7/1919 | Heintz | 280/204 |
| 2,186,065 | 1/1940 | Fischer | 280/112 A |
| 2,750,206 | 6/1956 | Sabato | 280/204 |
| 3,137,513 | 6/1964 | Marot | 280/112 A |

FOREIGN PATENTS OR APPLICATIONS

| 1,067,157 | 6/1954 | France | 280/204 |
| 607,583 | 12/1933 | Germany | 280/111 |
| 431,951 | 3/1948 | Italy | 280/204 |
| 24,643 | 11/1904 | United Kingdom | 280/203 |

Primary Examiner—Joseph F. Peters, Jr.
Assistant Examiner—John P. Silverstrim
Attorney, Agent, or Firm—H. Mathews Garland

[57] ABSTRACT

An attachment for bicycles for carrying packages, small articles, newspapers, and the like. The device includes a saddle-type load-carrying container over the rear wheel of a bicycle. An outrigger wheel assembly is connected to and spaced outwardly from each of the sides of the container including a load-bearing wheel mounted in a wheel skirt connected with the container side by an arrangement of straps and hinges which permit relative movement between the wheel skirt and the container allowing the wheel assembly to change positions relative to the rear wheel of the bicycle to compensate for irregular running surfaces. Vertically spaced bumper rollers are secured between the container sides and each wheel skirt to maintain the proper spacing in between the outrigger wheels and the container sides.

4 Claims, 5 Drawing Figures

BICYCLE PACKAGE TRANSPORT DEVICE

This invention relates to load-carrying apparatus and more particularly relates to a device for attachment to a bicycle to carry loads over the rear wheel of the bicycle.

A number of different types of load carrying attachments have been developed for use with bicycles to permit carrying various types of small to moderately sized articles. Several such devices are of the side-car type wherein the load-carrying container is secured along the side of the rear bicycle wheel supported by a supplementary wheel generally aligned with the bicycle rear wheel and spaced laterally from such wheel. While this form of device does increase the load-carrying capacity of the bicycle, it tends to impair the maneuverability of the bicycle to some extent depending upon the design of the device. Where a substantially rigid connection is made between the device and the bicycle, the making of turns is more difficult for the rider. If the rider turns in a direction toward the side on which the device is secured, the normal lean of the bicycle during a turn is prevented; while if the rider turns in a direction opposite from the side on which the device is secured, the device may be lifted off the ground so that an additional unbalanced weight is placed on the rider causing some instability. In other forms of side-car attachments for bicycles, the bicycle is permitted to lean relative to the load carrying attachment though the presence of the load on one side only of the bicycle tends to unbalance the bicycle and render it somewhat unstable in operation. In still further forms of bicycle package-carrying devices, a box or basket is mounted in saddle fashion over the rear wheel supported entirely by the rear wheel of the bicycle. This type of package carrier does permit the bicycle to have complete maneuverability; but, it also renders the bicycle somewhat unstable due to the entire load being carried by the rear wheel of the bicycle without supplementary support so that at low speeds in a turn the probability of loss of control is increased.

It is a primary object of the invention to provide a new and improved load carrying device for a bicycle which provides maximum load support along with stability and maneuverability. It is another object of the invention to provide a bicycle load device of the saddle type using outrigger wheels.

In accordance with the present invention, a bicycle load carrying attachment is provided which permits improved maneuverability and stability along with maximum load-carrying capability. The device of invention includes a saddle-type box or container mounted over the rear wheel of a bicycle and provided with auxiliary support by means of a pair of outrigger wheel assemblies mounted along opposite sides of the rear wheel of the bicycle providing auxiliary extra wheel support while permitting the bicycle to lean in each direction to a degree sufficient to retain the turning capability of the bicycle. The container includes a wheel well into which a portion of the rear wheel of the bicycle fits allowing the container to fit closely along the back and sides of the bicycle. Each outrigger wheel assembly includes a wheel mounted in a wheel skirt secured along a side of the container supporting the wheel parallel with the rear wheel of the bicycle and adapted to shift vertical and horizontal positions and tilt relative to the rear wheel of the bicycle to accommodate the system to irregular surfaces. The wheel skirts are each mounted by means of a hinge, strap, and bumper roller arrangement which allows for varying spacing and angular relationship between the wheel well and the container sides.

The foregoing objects and advantages together with specific details of a preferred embodiment of the present invention will be better understood from the following detailed description taken in conjunction with the accompanying drawings wherein.

Figure 1:
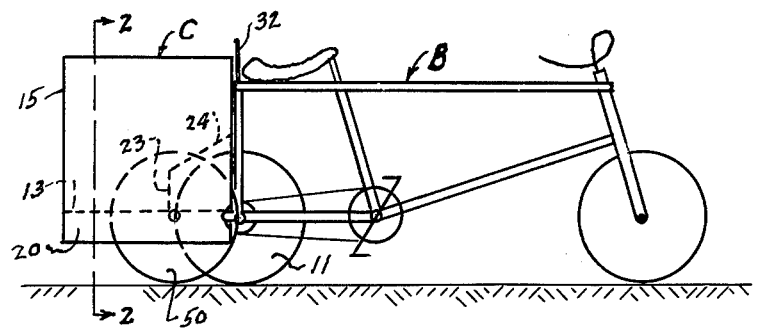
FIG. 1 is a schematic side view in elevation of a bicycle load-carrying attachment constructed in accordance with the invention mounted on a bicycle.
Figure 4:
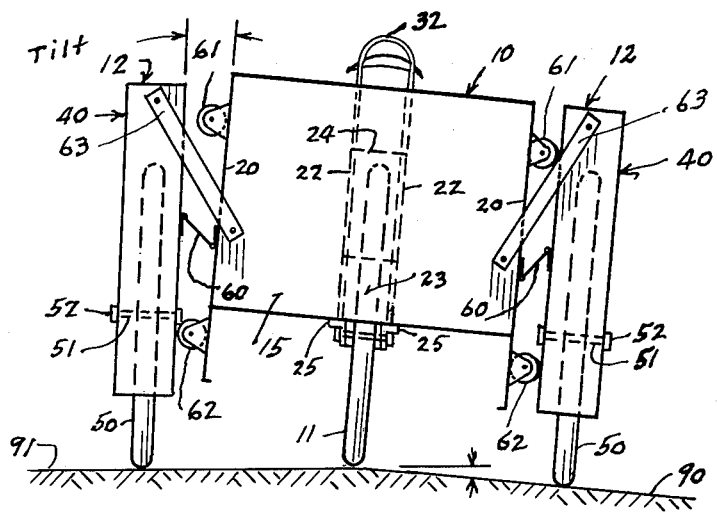
Figure 5:
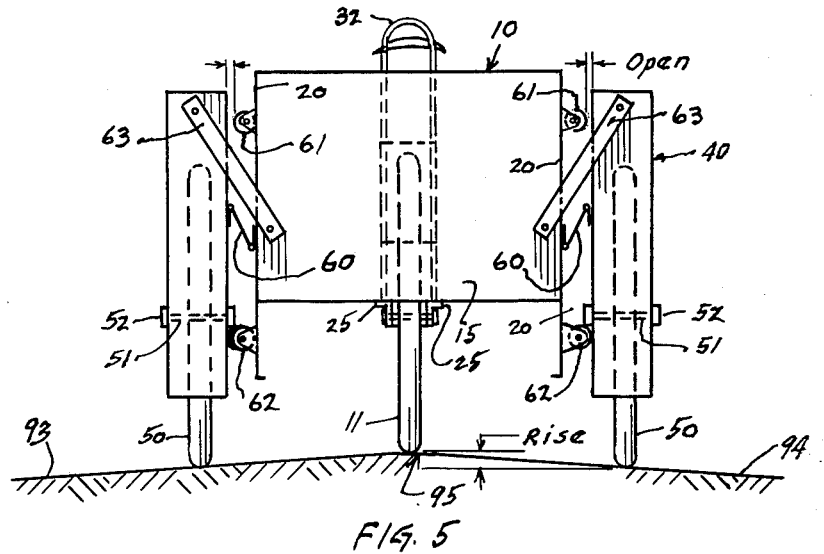

FIG. 4 is a rear view in elevation of the bicycle and load-carrying device shown in FIG. 1 moving along an irregular surface while making a right turn with the right outrigger wheel running at a lower elevation than the left outrigger wheel; and FIG. 5 is a rear view in elevation of the bicycle and carrying attachment running along another form of irregular surface wherein the bicycle is operating on a ridge while the outrigger wheels are each operating along surfaces at lower elevations.

Referring to the drawings, a carrying device C constructed in accordance with the invention is supported on a conventional bicycle B for using the bicycle for carrying loads of various types of articles. The device C includes a saddle-type container 10 mounted over the rear wheel 11 of the bicycle and additionally supported along the outer opposite sides by a pair of identical outrigger wheel assemblies 12. The container 10 provides substantial volume for carrying loads which are partially supported by the outrigger wheel assemblies. The wheel assemblies are mounted to provide continuing support along each side of the container while permitting the bicycle to lean during turns and when riding over surface irregularities. Each of the outrigger wheel assemblies may move both laterally and vertically along with being adapted to pivot to some extent about a horizontal longitudinal axis such that the wheel assemblies may move between parallel and nonparallel relationships with the sides of the container 10.

The container 10 is formed by a bottom panel 13, a forward panel 14, a rear panel 15, and opposite side panels 20. A wheel well 21 is monted in the container 10 opening through the bottom 13 to accomodate the rear upper quadrant of the rear wheel 11 as evident in FIG. 1. The wheel well is a housing formed by sides 22, a back 23, and a sloping top 24. The wheel well housing is opened at the front through the front container panel 14 and at the bottom through the container bottom panel 13 so that the rear wheel 11 of the bicycle may be partially covered by and rotate through the wheel well while the sides, top, and back of the wheel well prevent road dirt, moisture, and the like from being thrown into the container 10 by the rear bicycle wheel. The container 10 is vertically supported on the bicycle by a pair of angle irons 25 which are secured along the horizontal flanges of the angle irons to the bottom face of the container bottom 13 on opposite sides of the rear wheel 11 of the bicycle. The vertical flanges of the angle irons 25 are bolted to the horizontal bicycle frame members which support the rear wheel 11. The front on the container 10 is secured along the panel 13 by spaced bolts 30 connected with a plate 31 disposed along the front of the bars forming the vertical rear seat support 32 of the bicycle.

Each of the outrigger wheel assemblies 12 includes a wheel housing or skirt 40 formed by a top 41, an outside side panel 42, an inside side panel 43, a rear panel 44, and a front panel 45. The front panels 45 have a sufficient opening as evident in FIGS. 1 and 3 to permit a small segment of the forward edge of the outrigger wheel within the panel to project slightly forward of the wheel housing. An outrigger wheel 50 is mounted in each of the wheel housings 40 on an axle 51 secured between an outer mounting bracket 52 in the outer housing side panel 42 of the wheel housing and an inner mounting bracket 53 in the inner side panel 43. The bottom of each wheel housing, of course, is open so that the wheel may rotate to support the wheel housing from the surface along which the bicycle is running. The structure of both the right and left outrigger wheel assembly housings 40 is identical.

Figure 2:
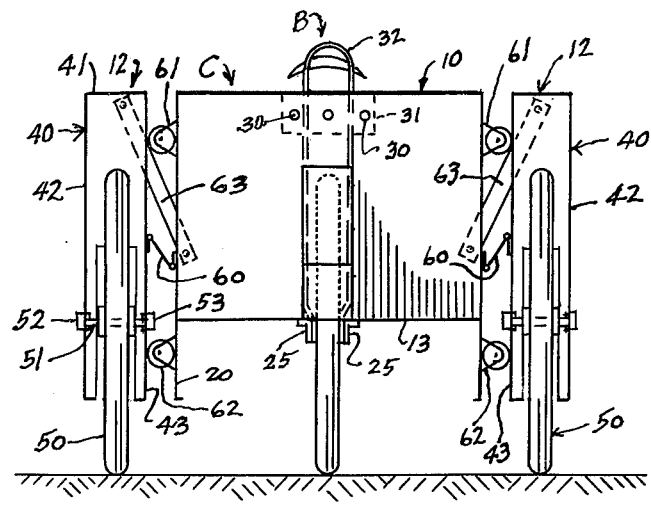
FIG. 2 is an enlarged schematic view in section and elevation of the device of the invention taken along the line 2—2 of FIG. 1.
Figure 3:
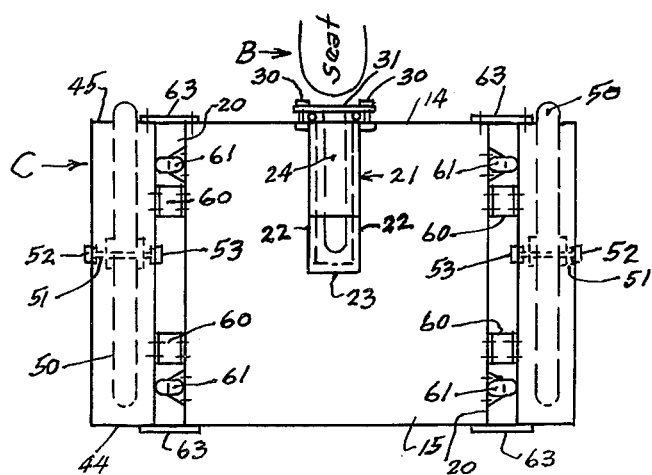
FIG. 3 is a fragmentary top plan view of the device of the invention showing only a rear portion of the bicycle on which the device is mounted.

Each of the outrigger wheel assemblies 12 is mounted by a pair of hinges 60 to the outer face of the adjacent side panel 20 of the container 10. As seen in FIG. 3, the hinges 60 are longitudinally spaced between the container and the wheel housing. As seen in FIG. 2, the hinges 60 are mounted about midway between the top and bottom of the wheel housing. The outrigger wheel assembly housings are each held in spaced relationship with the side of the container 10 by a pair of upper rollers 61 and lower rollers 62 which are secured along the outer faces of the side panels of the container 10. The pairs of lower rollers 62 are mounted on downwardly projecting extensions of the side panels 20 of the container below the bottom 13. The rollers 61 and 62 along each of the side panels of the container provide minimum even side spacing and support for each of the housings of the outrigger wheel assemblies while allowing each of the wheel assemblies to move upwardly and downwardly laterally relative to the container. A pair of flexible snubbers 63 is secured between each of the outrigger wheel assembly housings and the container. The outer upper ends of the snubbers are secured on the front and rear faces of the wheel housings 40 and near the top of the housings while the lower ends of the snubbers are secured with the front and rear faces of the container panels 14 and 15 down toward the bottom of the container. Thus, the snubbers slope downwardly and inwardly from the upper portions of the wheel housings to the lower portion of the container so that they tend to pull the wheel housings somewhat downwardly and inwardly to hold them in parallel relationship with the sides of the container against the rollers 61 and 62 when the bicycle is moving over a smooth surface. The snubbers 63 are preferably made of a flexible material such as rubber which may be tightly secured in a somewhat stretched relationship to bias the outrigger wheel assemblies both toward the container. The hinges 60 transmit vertical loads between the container and the outrigger wheel assemblies while permitting the wheel assemblies to tilt and move vertically and horizontally relative to the container. Also, some load is transmitted vertically between the container 10 and the outrigger wheel assemblies by the snubbers 63.

The load supporting device C permits the bicycle B to carry a substantial quantity of various types of articles while providing the bicycle substantial stability together with a maximum of maneuverability. The bicycle is permitted a degree of lean during both right and left turns while the outrigger wheel assemblies remain on the running surface since the wheels and wheel housings of the assemblies may move vertically and laterally and lean relative to the container. Both the upper and lower portions of the wheel assemblies may move toward and away from the container and may move upwardly and downwardly. Thus, the bicycle and container outrigger wheels readily adapt to irregular surfaces as evident in both FIGS. 4 and 5. As illustrated in FIG. 4, the bicycle and container may lean toward the right as the right outrigger wheel assembly rolls along a downwardly sloping surface 90 which extends below the level of the level surface 91. Since the bicycle is leaning toward the right, the right outrigger assembly tends to stay parallel with the right side of the containers 10 while the left side of the container is raised with the hinges 60 tending to allow the left outrigger assembly to move away along the upper portion away from the upper rollers 61 while the lower portion of the inner face of the wheel housing on the left outrigger assembly stays in contact with the lower rollers 62. The snubbers 63 maintain the left wheel housing under control while allowing it to spread apart tilting away from the container 10.

FIG. 5 illustrates a surface condition in which running surfaces 93 and 94 are at an angle with each other meeting at a ridge 95 along which the wheel 11 of the bicycle is running. Wheels 50 of the outrigger wheel assemblies are running along the lower elevation surfaces 93 and 94 as both the right and left outrigger assemblies have moved downwardly. It will be evident from FIGS. 4 and 5 that substantial movement may take place between the outrigger assemblies and the bicycles and container 10 whereby continuous load support is provided to the container and rear wheel portion of the bicycle while the bicycle maneuvers over a variety of running surfaces. Normal turns may be made without lifting either of the outrigger wheel assemblies off the running surface so that there is no occasion for the bicycle along with the load-carrying apparatus to operate under unstable conditions.

While the device of invention has been illustrated in connection with a bicycle utilizing rather small wheels, it will be obvious that it may be designed to fit any desired size bicycle and relative wheel size.

What is claimed is:

1. A load carrying device for a bicycle having a frame, a seat post, a ground engaging rear wheel, and a front steerable wheel, said device comprising: a container having a wheel well along its forward central portion for accommodating said rear wheel, means for rigidly securing said container to said frame rearwardly of said seat post, a pair of outrigger assemblies, a ground engaging wheel rotationally mounted on each of said outrigger assemblies, and means for mounting each of said outrigger assemblies on opposite sides of said containers, respectively, including hinge means secured between each of said outrigger wheel assemblies and an adjacent side face of said container, roller spacer means between said adjacent side face of said container and said wheel assembly, and elastic snubber means between said container and said outrigger wheel assemblies for biasing said assemblies toward said container against said roller means, said mounting means permitting said outrigger assemblies to move vertically, laterally, and tiltably relative to said container.

2. A device in accordance with claim 1 wherein said hinge means comprises a pair of hinges longitudinally spaced near the vertical midpoint of said wheel assemblies, said roller means comprises a pair of upper longitudinally spaced rollers and a pair of lower longitudinally spaced rollers between each of said wheel assemblies and the adjacent side face of said container, and said snubber means comprises an elastic strap between the front portions of said container and said wheel assemblies and an elastic strap between the rear portions of said wheel assemblies and said container.

3. A device in accordance with claim 2 wherein said straps are secured at upper outer ends with said outrigger wheel assemblies and at lower inner ends with said container whereby said outrigger wheel assemblies are biased downwardly and inwardly relative to said container.

4. A device in accordance with claim 3 wherein each said outrigger wheel assembly includes a wheel housing enclosing an outrigger wheel therein along the sides, top, and forward and rear edges of said outrigger wheel.

* * * * *